US012582094B2

(12) United States Patent　　(10) Patent No.: US 12,582,094 B2
Macdonald　　(45) Date of Patent: Mar. 24, 2026

(54) EQUINE BOOT

(71) Applicant: Scootboot Pty Ltd, Tasmania (AU)

(72) Inventor: David Duncan Macdonald, Koonya (AU)

(73) Assignee: SCOOTBOOT PTY LTD, Tasmania (AU)

( * ) Notice: Subject to any disclaimer, the term of this patent is extended or adjusted under 35 U.S.C. 154(b) by 368 days.

(21) Appl. No.: 16/613,824

(22) PCT Filed: Jun. 1, 2018

(86) PCT No.: PCT/AU2018/050543
　　§ 371 (c)(1),
　　(2) Date: Nov. 15, 2019

(87) PCT Pub. No.: WO2018/218307
　　PCT Pub. Date: Dec. 6, 2018

(65) Prior Publication Data
　　US 2020/0178502 A1　　Jun. 11, 2020

(30) Foreign Application Priority Data

Jun. 2, 2017　(AU) ................................. 2017902111

(51) Int. Cl.
　　*A01K 13/00*　　(2006.01)
　　*A01L 5/00*　　(2006.01)
(52) U.S. Cl.
　　CPC ............... *A01K 13/007* (2013.01); *A01L 5/00* (2013.01)

(58) Field of Classification Search
　　CPC .......... A01K 13/007; B68B 7/00; B68C 5/00; A01L 5/00
　　See application file for complete search history.

(56) References Cited

U.S. PATENT DOCUMENTS

| 4,185,695 | A | 1/1980 | Hancock | |
| 2009/0235621 | A1* | 9/2009 | Ford | A01L 5/00 |
| | | | | 54/82 |
| 2014/0231101 | A1* | 8/2014 | Ford | A01L 3/02 |
| | | | | 168/12 |
| 2016/0249596 | A1 | 9/2016 | Ford | |

FOREIGN PATENT DOCUMENTS

| DE | 19742274 | A1 | | 3/1998 | |
| DE | 19826099 | A1 | | 11/1998 | |
| EP | 2409565 | A1 | * | 1/2012 | ........... A01K 13/007 |
| ES | 1179958 | A1 | | 3/2017 | |
| GB | 2499813 | A | * | 9/2013 | ........... A01K 13/007 |

(Continued)

OTHER PUBLICATIONS

WO 1984000094 A1 machine translation (Year: 1984).*

(Continued)

*Primary Examiner* — Son T Nguyen
(74) *Attorney, Agent, or Firm* — Westman, Champlin & Koehler, P.A.; David D. Brush

(57) ABSTRACT

An equine boot comprising a shell, the shell including: a bottom portion for substantially covering the underside of a hoof; an upper adhesively attachable to the hoof to secure the boot thereto; and an aperture through which fluid can reach the underside of the hoof to flush debris therefrom.

11 Claims, 12 Drawing Sheets

(56) References Cited

FOREIGN PATENT DOCUMENTS

| | | | | |
|---|---|---|---|---|
| SE | 1251086 A1 * | 3/2014 | | |
| WO | WO-8400094 A1 * | 1/1984 | .............. | A01L 5/00 |
| WO | WO-2009050750 A1 * | 4/2009 | .......... | A01K 13/007 |
| WO | 2010039901 A1 | 4/2010 | | |
| WO | 2014138790 A1 | 9/2014 | | |
| WO | WO-2015158935 A1 * | 10/2015 | .......... | A01K 13/007 |
| WO | WO-2017165892 A1 * | 9/2017 | .......... | A01K 13/007 |

OTHER PUBLICATIONS

International Search Report dated Aug. 16, 2018 for corresponding International Application No. PCT/AU2018/050543, filed Jun. 1, 2018.

Written Opinion of the International Searching Authority dated Aug. 16, 2018 for corresponding International Application No. PCT/AU2018/050543, filed Jun. 1, 2018.

* cited by examiner

EQUINE BOOT

TECHNICAL FIELD

The present invention relates generally to the field of equine hoof protection. In particular, the invention relates to an equine boot.

BACKGROUND

Equine animals such as horses have been shod with metal shoes as a means of protecting their hooves from wear. However, the use of such metal horseshoes can pose various problems.

Metal horseshoes have to be replaced every six to eight weeks, and this can be expensive and time-consuming. Aside from following a regular shoe replacement schedule, shoes also need replacing when horses lose their shoes. Nailing metal shoes to a horse's hoof can also damage the hoof wall and concuss the horse's hoof capsule and skeletal frame. In addition, restriction of normal movement of the hoof by metal horseshoes can lead to undesirable changes in the hoof and, in some cases, cause disease.

Although horse boots have been developed partly in response to concerns about the health of horse hooves, there is nevertheless room for improvement. It is desired to provide an equine boot that overcomes or alleviates one or more difficulties of the prior art, or to at least provide a useful alternative.

SUMMARY

According to a first aspect of the present invention, there is provided an equine boot comprising a shell, the shell including: a bottom portion for substantially covering the underside of a hoof; an upper adhesively attachable to the hoof to secure the boot thereto; and an aperture through which fluid can reach the underside of the hoof to flush debris therefrom. Since fluids such as water and anti-bacterial medicines can reach the underside of the hoof even when the boot is adhesively attached thereto, the boot need not be removed in order to clean the hoof.

The boot may be securable to the hoof solely by the adhesive attachment between the upper and the hoof. As such, additional fittings such as straps and buckles are not required to secure the boot to the hoof, thereby reducing the costs and complexity associated with producing the boot. Moreover, by avoiding the application of adhesive on the bottom portion of the boot, the underside of the hoof escapes any discomfort that would otherwise be caused by a hardened and/or uneven adhesive layer on the bottom portion.

In some embodiments, the aperture is formed at a lower end of the upper. As such, water can flow through the aperture and directly underneath the hoof to clean the underside of the hoof.

In some embodiments of the invention, the aperture is formed at the toe end of the boot, and water can be flushed through the aperture and drained from the boot through an open end thereof. By establishing a fluid flow path whereby water can enter and drain from the boot at different locations, the potential for stale and contaminated water to remain within the boot is reduced.

In some embodiments, the shell is open at its rear such that the rear of the hoof is substantially uncovered. As such, a hoof can easily be inserted and attached to the boot by guiding the hoof through the open rear end.

In some embodiments, the shell is made from a resilient material such that when the boot is adhesively attached to the hoof, the bottom portion can be urged away from the underside of the hoof. In these embodiments of the invention, tools such as screwdrivers and knifes can be inserted through the aperture to pry the bottom portion away from the underside of the hoof. A syringe loaded with an anti-bacterial medicine can also be inserted through the aperture and underneath the hoof in order to apply the medicine to the underside of the hoof.

In some embodiments of the invention, the upper comprises opposed and spaced apart walls which are configured to flex away from one another. By flexing the spaced apart walls outwardly and away from one another, glue can be more easily applied to the inner surfaces of the walls.

In some embodiments of the invention, a slit at the toe end of the boot substantially separates the spaced apart walls, the slit opening up into the aperture.

In some embodiments, the upper comprises an opening through which glue, applied to an inner surface of the upper, can exude as the upper is glued onto the hoof. It is envisaged that the glue can set within and thus plug the opening of the upper, thereby improving bonding between the boot and the hoof.

The present invention also provides an equine boot comprising a shell, the shell including: a bottom portion substantially covering the underside of a hoof; an upper adhesively attached to the hoof to secure the boot thereto; and an aperture through which fluid can reach the underside of the hoof to flush debris therefrom.

According to a second aspect of the present invention, there is provided an equine boot including: a bottom portion for engaging with the underside of a hoof; an upper for enclosing at least a portion of a hoof wall of the hoof; and openings for accommodating growth of the hoof, each opening being formed through a respective lateral side of the upper where it meets the bottom portion. The openings in the upper can accommodate hoof growth by allowing flaring of the hoof to protrude therethrough, thereby reducing the frequency with which the boot is removed from the hoof in order to trim it. Additionally, liquids can also flow through the openings so as to flush debris from the underside of the hoof.

In some embodiments, the upper comprises opposed and spaced apart walls, and fluid can flow through the opening in one wall, flush the underside of the hoof and be drained from the boot through the opening in the other wall.

In some embodiments, each of the spaced apart walls is configured to flex relative to one another. For example, the spaced apart walls can be flexed outwardly and away from one another such that glue can be more easily applied to the inner surfaces of those walls. The flexibility of the walls also helps with absorbing impacts between the hoof and the boot.

In some embodiments, the boot further comprises an aperture through which fluid can reach the underside of the hoof to flush debris therefrom. The aperture may be formed at a lower toe end of the upper, and water can be flushed through the aperture and drained through the openings of the upper and/or an open end of the boot.

In some embodiments, the boot is substantially open at its rear such that the rear of the hoof is substantially uncovered.

In some embodiments, the upper and/or the bottom portion is/are made from a resilient material such that when the boot is secured to the hoof, the bottom portion can be urged away from the underside of the hoof. In this way, even while the boot is worn, the underside of the hoof can be accessed for cleaning and inspection.

In some embodiments, a slit at the toe end of the boot substantially separates the spaced apart walls, the slit opening up into the aperture. This slit facilitates the flexing of the spaced apart walls. The slit and aperture being in communication with one another may permit even greater flexure of the spaced apart walls relative to one another.

The present invention also provides an equine boot including: a bottom portion engaging with the underside of a hoof; an upper enclosing at least a portion of a hoof wall of the hoof; and openings for accommodating growth of the hoof, each opening being formed through a respective lateral side of the upper where it meets the bottom portion.

In some embodiments, the boot may be secured to the hoof solely by adhesive attachment between the boot and the hoof. For example, the boot may be secured to the hoof solely by adhesive attachment between the upper and the hoof. In this way, no further attachment means or fastening features are necessary, making the application and removal of the boot relatively simple and easy, thereby reducing associated time and labour costs.

In some embodiments, the bottom portion substantially covers the underside of the hoof. It is of course considered that the bottom portion can have openings to allow for ventilation or liquids to gain access to the underside of the hoof. In this way, the underside of the hoof may simply be cleaned or washed by having the horse walk or stand in water.

Of course, the aforementioned features in each aspect of the invention can be combined in various ways without departing from the scope of the invention.

BRIEF DESCRIPTION OF THE DRAWINGS

Some embodiments of the invention will be further described, by way of non-limiting example only, with reference to the accompanying drawings in which.

DETAILED DESCRIPTION

FIGS. 1 to 5 show an equine boot 5 according to a first embodiment of the present invention. The boot 5 comprises a shell configured to be worn on a hoof of a horse. The shell includes a ground-engaging bottom portion 10 which substantially covers the underside of the hoof such that the hoof is shielded from the ground. The ground-engaging portion 10 includes a hoof-engaging interior surface 40 and an exterior surface with a suitable tread for engaging the ground.

Figure 3:
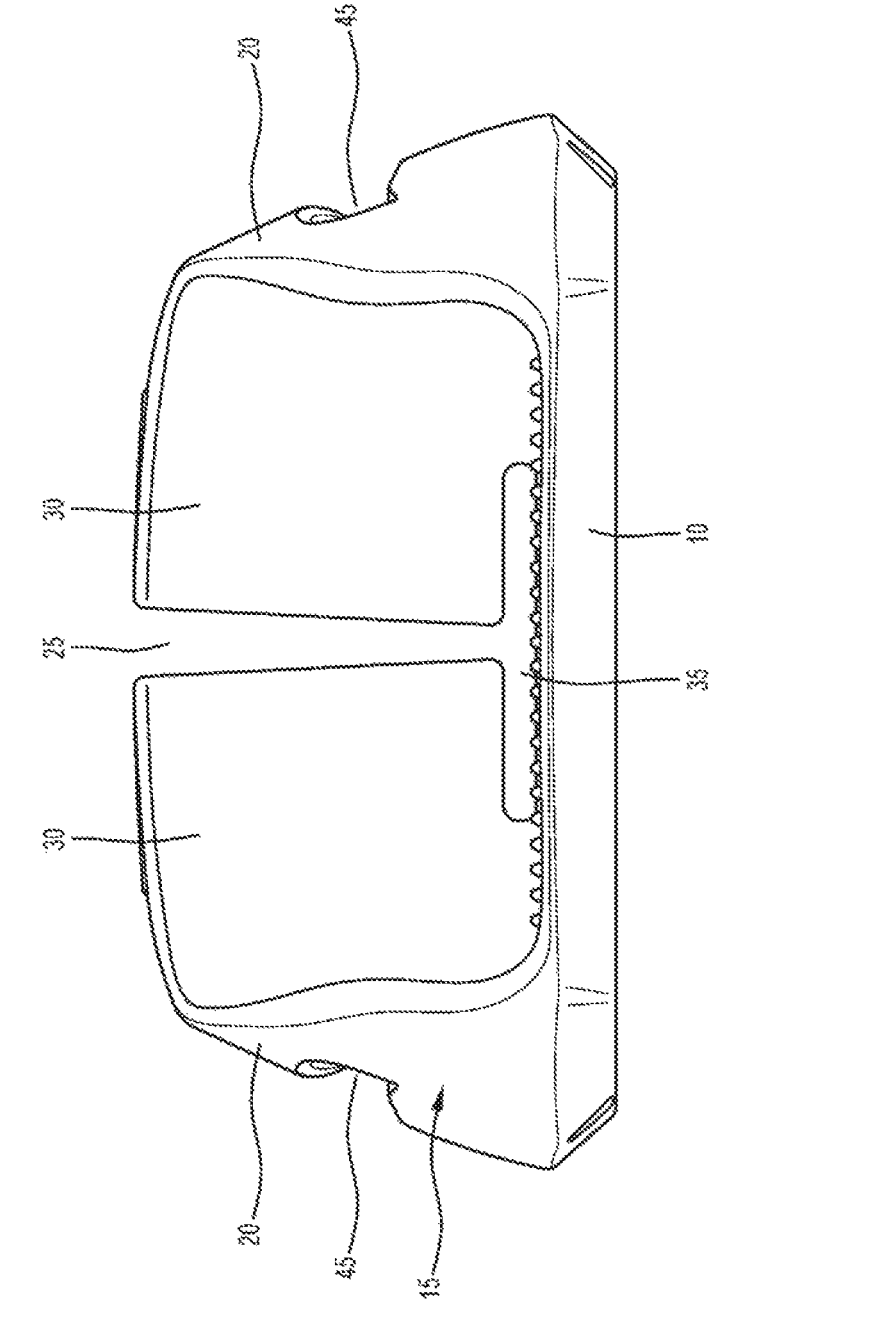
FIG. 3 is a rear view of the equine boot of FIG. 1.
Figure 4:
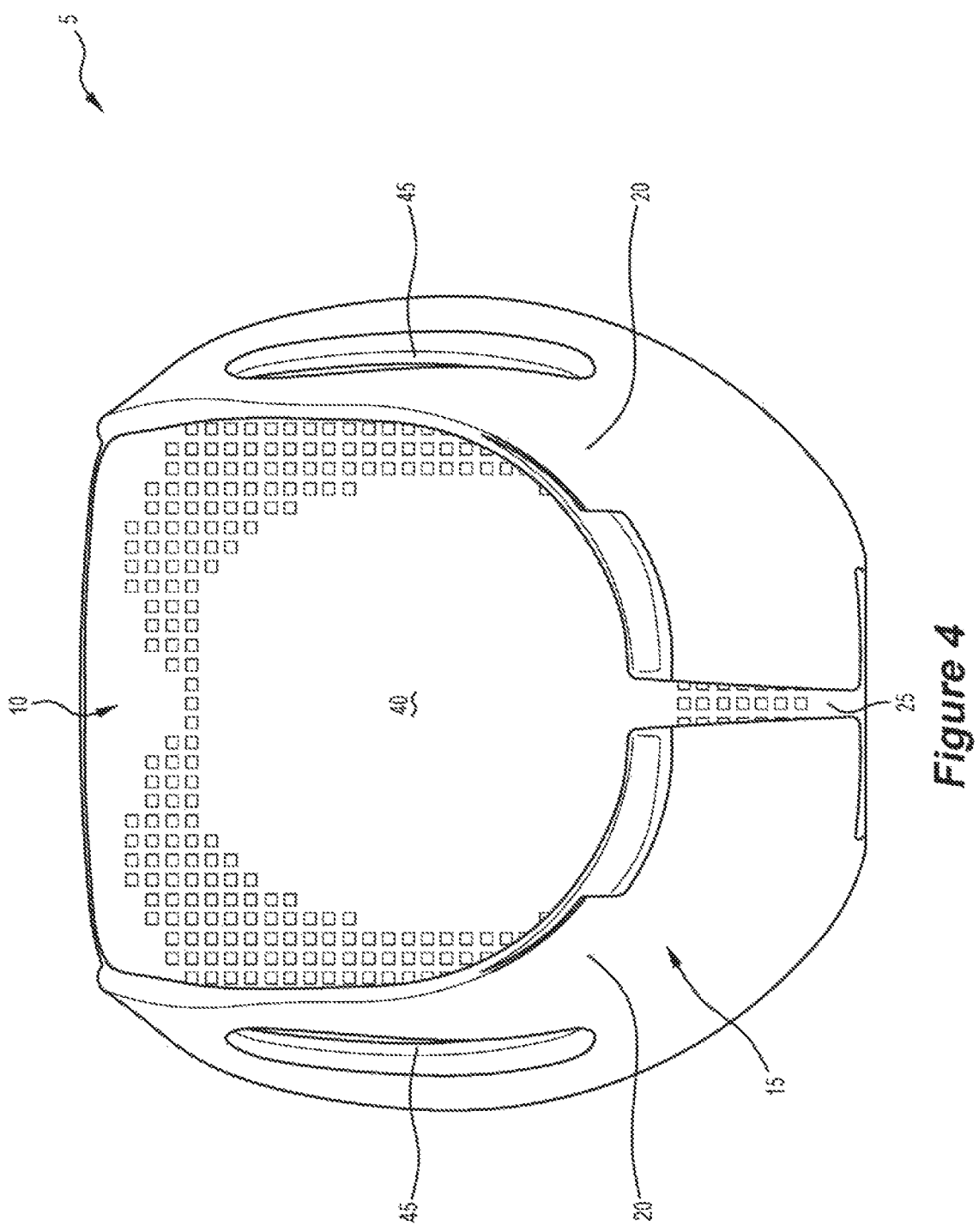
FIG. 4 is a top view of the equine boot of FIG. 1.

The shell also includes a boot upper 15 which is configured to be adhesively attached to the hoof to secure the boot 5 to the hoof. In the depicted embodiment, the upper 15 comprises two opposed and spaced apart side walls 20 which are contoured so as to fit snugly to the hoof wall. As seen in FIGS. 3 and 4, the side walls 20 do not extend around the rear of the hoof; in this way, the rear end of the boot 5 is completely open all the way down to the hoof-engaging interior surface 40. This is in contrast to prior art boots, the rear ends of which have lips or walls protruding upwardly from the hoof-engaging surface. A disadvantage of these prior art boots is that the lip or upstanding wall can make it more difficult to insert cleaning apparatuses, such as a hose, between the boot and the underside of the hoof via the rear end; the lip or upstanding wall works to obstruct the hose.

Still referring to FIGS. 3 and 4, the side walls 20 are made from a resilient material, such as a suitable polymer, to offer a degree of flexibility and expansion to accommodate hoof growth and hooves of various shapes and sizes. Advantageously, the flexibility of the side walls 20 allows them to flex in response to impact from the toe of a horse's hoof against the interior surface of the side walls 20, particularly when the horse is traveling relatively fast or landing from a jump. This ability of the boot upper 15 to flex and absorb some of the pressure that would otherwise be dispersed to the horse's toe makes the boot 5 more comfortable than prior art boots.

The shell may be produced by an injection moulding process such that the ground-engaging bottom portion 10 and the boot upper 15 are integrally formed. For example, thermoplastic polyurethane of 60 Shore D hardness by Bayer® can be injected into a mould, left for an appropriate time to harden, and then removed therefrom.

With reference to FIG. 3, a suitable glue can be applied to the inner surfaces 30 of the side walls 20 before pressing those surfaces 30 against the hoof wall and allowing the glue to set, thereby securing the boot 5 to the hoof.

Figure 5:
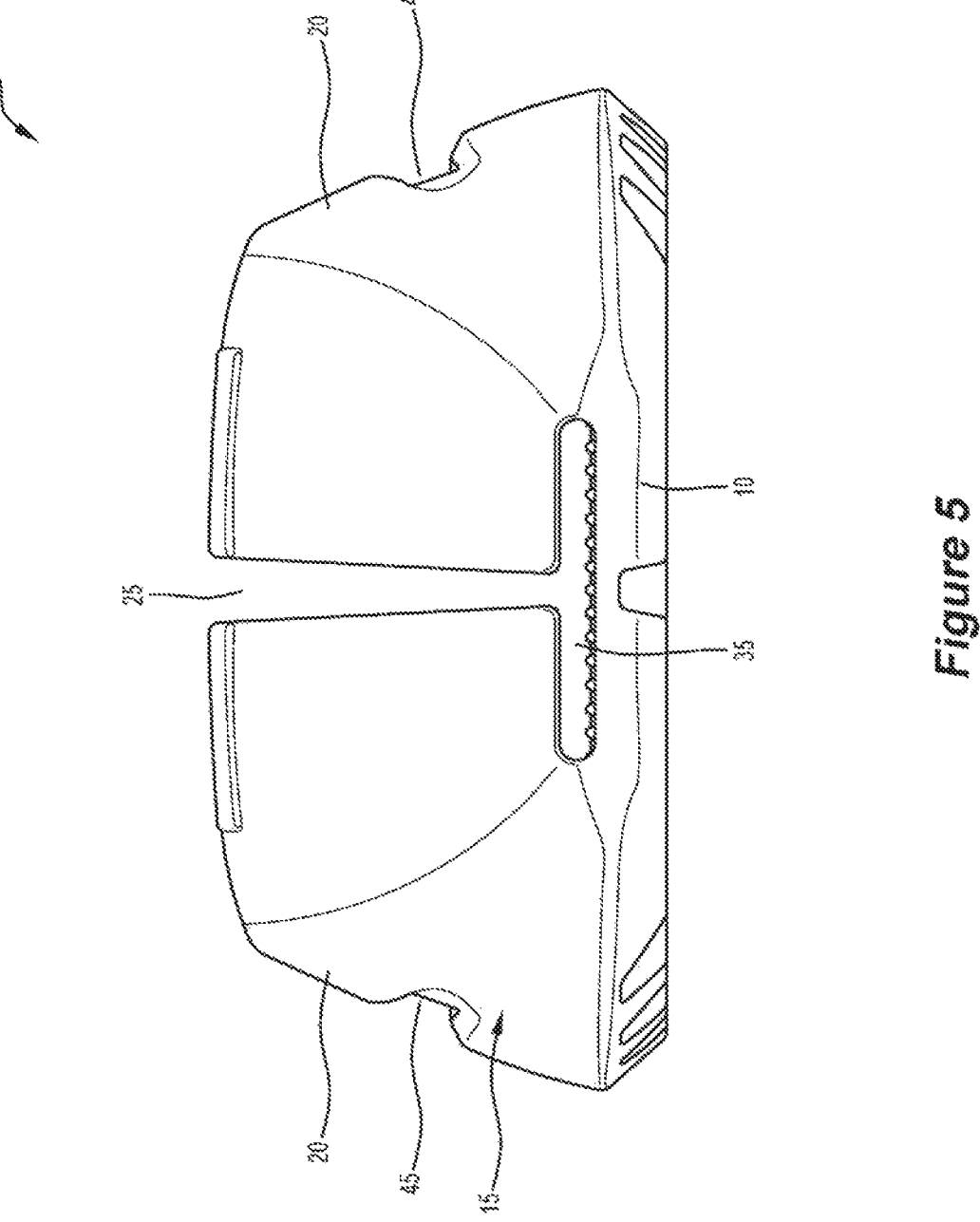
FIG. 5 is a front view of the equine boot of FIG. 1.

Referring to FIGS. 3 to 5, a slit 25 at the toe end of the boot 5 substantially separates the boot upper 15 into the two resilient side walls 20, and allows them to flex outwardly and away from one another. With regard to prior art boot uppers that cannot be flexed in this way, it can be a cumbersome and clumsy process to apply glue to the inner surfaces of those uppers. A consequent problem is that the glue can be mistakenly applied to the interior surface 40 of the bottom portion 10 that engages the underside of the hoof, or it may be applied at too low a location on the inner surface 30 of the upper 15 such that it seeps onto the hoof-engaging interior surface 40 of the bottom portion 10. This can be problematic because once the glue sets, it can be relatively hard and thus a source of discomfort and/or hoof damage if the rigid glue on the hoof-engaging interior surface 40 of the bottom portion 10 is constantly pressed against the underside of the hoof. The ability to flex the side walls 20 of the present boot 5 outwardly allows the gluer better access to the inner surfaces 30 of the side walls 20, thereby reducing the likelihood that glue is inadvertently applied to the hoof-engaging interior surface 40 of the bottom portion 10. Advantageously, boots 5 embodying the present invention can be secured to the hoof solely by adhesive attachment between the hoof and the inner surfaces 30 of the upper 15.

Figure 1:
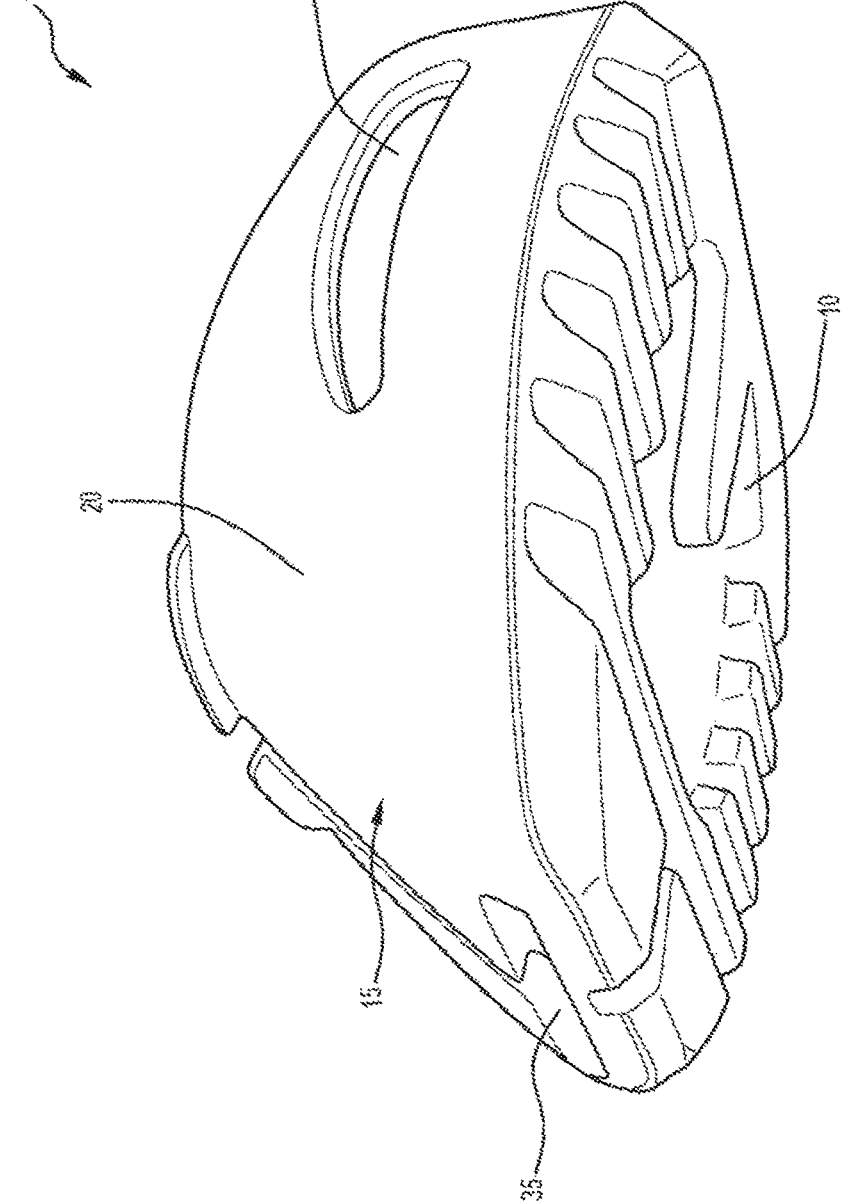
FIG. 1 is a bottom perspective view of an equine boot according to a first embodiment of the present invention.

Referring to FIGS. 1, 3 and 5, the shell includes an aperture 35 through which fluid can reach the underside of the hoof while the boot 5 is attached thereto. Since the boot can be worn by gluing only the side walls 20 to the hoof, the underside of the hoof is generally not glued to the bottom portion 10 to allow liquids such as water and anti-bacterial medicines to be flushed through the aperture 35 to clean the underside of the hoof, and thus prevent or treat bacteria build-up in the boot 5. The ability to clean the hoof without removing the boot 5 drastically reduces the time and labour costs associated with a typical cleaning cycle that involves completely removing the boot from the hoof, cleaning the hoof, and regluing the boot to the hoof every week or two. In contrast, the equine boot 5 described herein need only be removed and reglued in accordance with a horse's regular hoof trimming cycle, which can be as long as five or six weeks. It is also possible that normal riding of a horse can lead to cleaning of the underside of the hoof even while the boot is worn; for example, the act of riding a horse through clean bodies of water could itself be sufficient to clean the underside of the hoof since it is not glued to the boot 5.

With reference to FIGS. 3 and 5, the aperture 35 is formed as a horizontal slit at a lower end of the upper 15 at the toe end of the boot 5. By forming the aperture 35 at a lower end of the upper 15, not only does it provide a more direct route for liquids to access the underside of the hoof, it also provides a window through which one can visually assess whether glue may have been inadvertently applied to the hoof-engaging interior surface 40 of the bottom portion 10. In the depicted embodiment, the vertical slit 25 opens up into the horizontal aperture 35, such that the slit 25 and aperture 35, together, form an upside down T-shaped opening in the boot upper 15 which separates the two side walls 20 and facilitates their flexing relative to one another.

With the boot 5 secured to the hoof, water can be flushed through the aperture 35 and drained out the open rear end of the boot 5. Of course, liquids can also be flushed through the boot 5 in the reverse direction.

The shell is made from a resilient material such that when the boot 5 is secured, via glue between the hoof and the inner surface 30 of the boot upper 15, the bottom portion 10 can be manually urged away from the underside of the hoof to gain better access thereto. For example, a screwdriver or knife can be inserted into the aperture 35 so as to pry the bottom portion 10 away from the underside of the hoof. This can be done to ensure that no glue has been applied to the bottom portion 10. Additionally, the ability to access the underside of the hoof allows for the application of anti-bacterial medicines to the underside of the hoof via a syringe which can be inserted through the aperture 35 or the open rear end of the boot 5.

Figure 2:
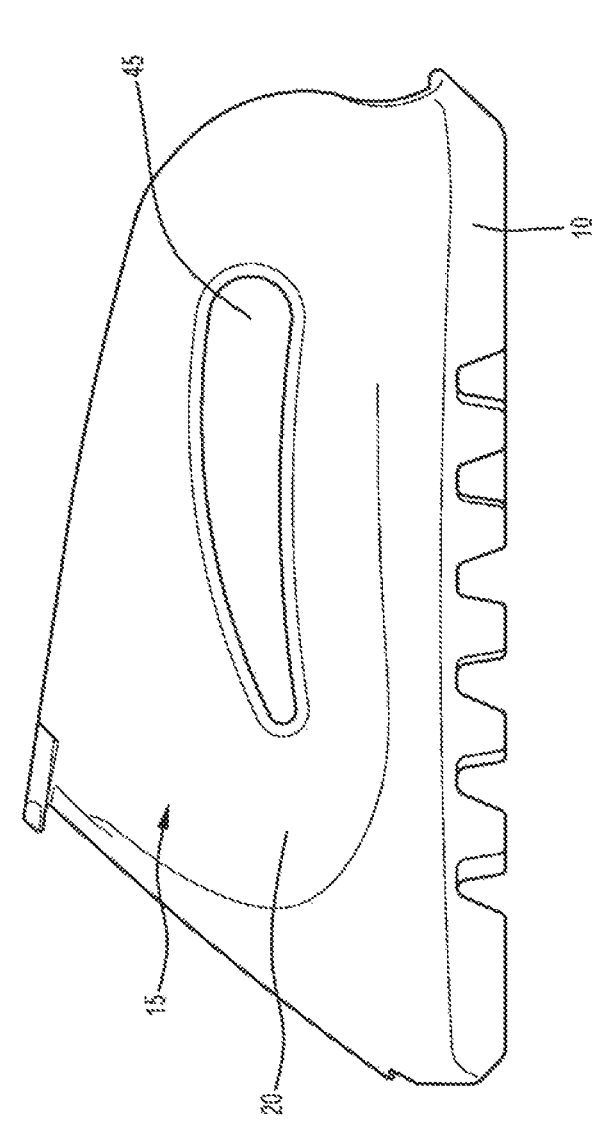
FIG. 2 is a side view of the equine boot of FIG. 1.

With reference to FIGS. 1 and 2, each side wall 20 comprises an elongate opening 45 through which glue, applied to the inner surface 30 of the upper 15, can exude or seep out as the boot 5 is glued on to the hoof. The glue that exudes out through the opening 45 is allowed to set and plug up the opening 45, thereby providing additional bonding between the boot 5 and the hoof, particularly because the glue forms an additional anchor between the boot 5 and the hoof. Glue can similarly exude out of and plug up the slit 25 at the toe end of the boot 5 if so desired. The elongate openings 45 also help to accommodate hoof growth in that the flaring out of hooves can simply protrude through the elongate openings 45. In this way, the boot need not be removed to trim the horse's hooves as regularly because the boot provides openings through which the growth can protrude.

Figure 6:
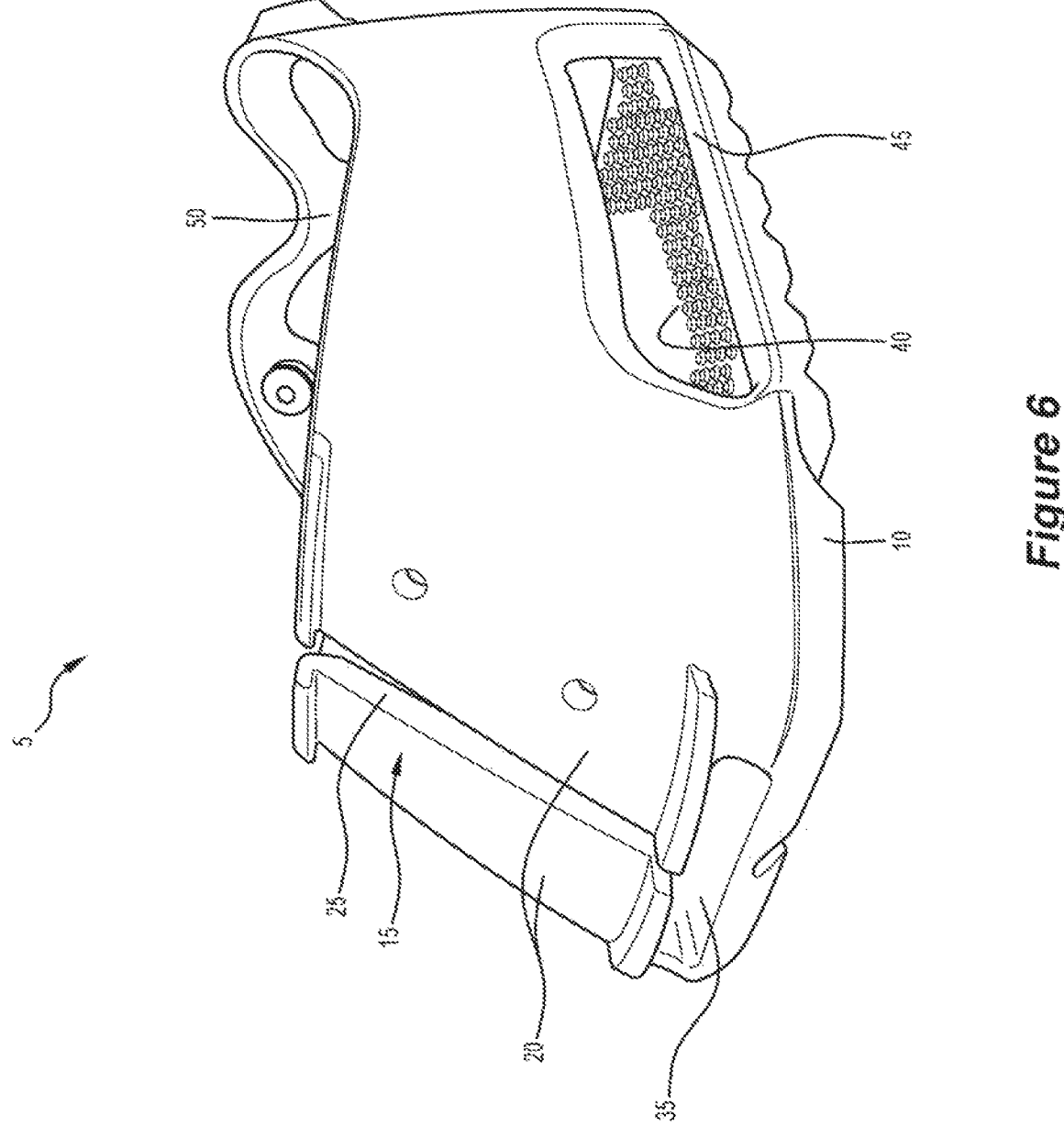
FIG. 6 is a side perspective view of an equine boot according to a second embodiment of the present invention.
Figure 7:
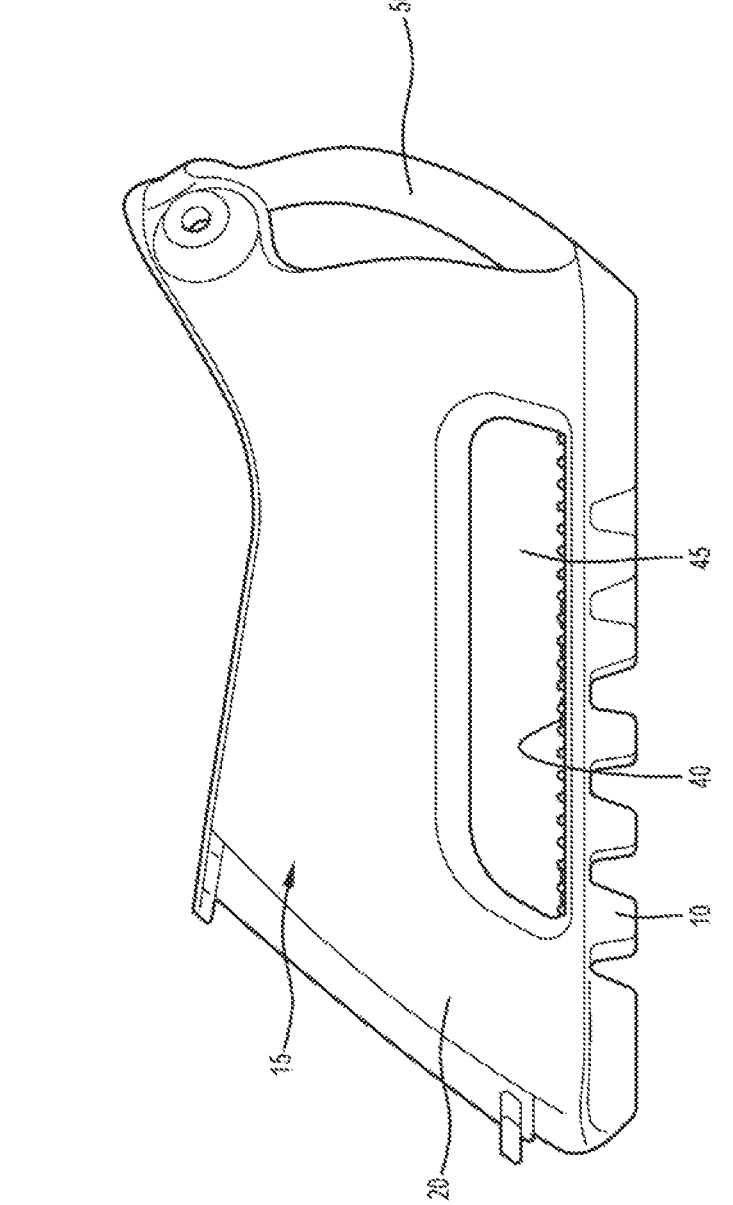
FIG. 7 is a side view of the equine boot of FIG. 6.

FIGS. 6 and 7 show a boot 5 according to a second embodiment of the invention, wherein identical reference numerals denote features that have already been described above with reference to the first embodiment of the invention. In this second embodiment, openings 45 are formed through the side walls 20 of the upper 15 where the side walls 20 would otherwise meet the bottom portion 10. In this embodiment, it is not intended for glue to exude through the openings 45. Instead, the openings are provided at the level of the bottom portion 10 to accommodate hoof growth. More particularly, hooves flare outwardly as they grow; this flaring can thus protrude through the openings 45. As a result, the frequency with which the boot 5 needs to be removed to trim the hoof can be reduced, since at least some of the hoof growth can be accommodated through the openings 45. The openings 45 also provide a further pathway via which fluids such as water and liquid medicines can reach the underside of the hoof and/or be flushed from the interior of the boot 5. Moreover, without the elongate openings 45 accommodating hoof growth, which is typically more prominent at the lower end of a hoof, such growth would urge against the lower interior surfaces of the side walls 20. This urging can compromise and even dislodge contact between the upper interior surfaces of each side wall 20 and the corresponding adjacent hoof wall surfaces, thereby compromising the fit of the boot 5 on the hoof, as well as the secureness of that fit. Hoof growth can also be accommodated by the substantially open rear end of the boot 5, the aperture 35 and/or vertical slit 25 at the toe end of the boot 5, as well as the resilient and flexible nature of the upper 15.

With regard to the boot 5 of the second embodiment, it is envisaged that the upper 15 could substantially enclose the entire hoof wall, with the exception of the openings 45. In such an embodiment, the upper 15 is not provided with the depicted slit or aperture 35. Moreover, while the inner surface of the upper 15 can similarly be applied with glue to adhere the boot to the hoof, other means of securing the boot to the hoof can be employed; for example, boot straps, buckles and other common fastening means can be used. In the depicted embodiment, the boot 5 includes a shank or web 50 which contacts, meshes or interlocks with the cleft of the bulbs of the hoof so to as impede rotation of the boot 5 relative to the hoof. Of course, the boot 5 need not have the shank or web, and can instead be substantially open at its rear end, much like the boot 5 of the first embodiment. Alternatively, instead of having an open rear end, the upper 15 can simply extend around the entire hoof wall. It is also envisaged that the bottom portion 10 need not substantially cover the underside of the hoof; for example, it could simply cover and/or engage with the peripheral wall of the underside of the hoof.

FIGS. 8 to 12 show a boot 5 according to a third embodiment of the invention, wherein identical reference numerals denote features that have already been described above with reference to the first and second embodiments of the invention. This third embodiment is similar to the second embodiment, but includes additional fastening and securing features. The toe end of the boot 5 includes two straps 60 which can releasably clasp the two side walls 20 together such that they do not flex beyond a certain extent in response to impact from the horse's hoof. This may allow the boot to fit better to smaller hooves. Facing the boot 5 of FIG. 9 front on, the left side of each strap 60 is attached to the left side wall 20 via conventional attachment means, such as a screw, and the right side of each strap is configured with a resilient opening. The right side wall 20 has corresponding studs which are inserted through respective resilient openings of the straps such that the straps 60 clasp the side walls 20 together and inhibit their flexing away from one another.

Figure 9:
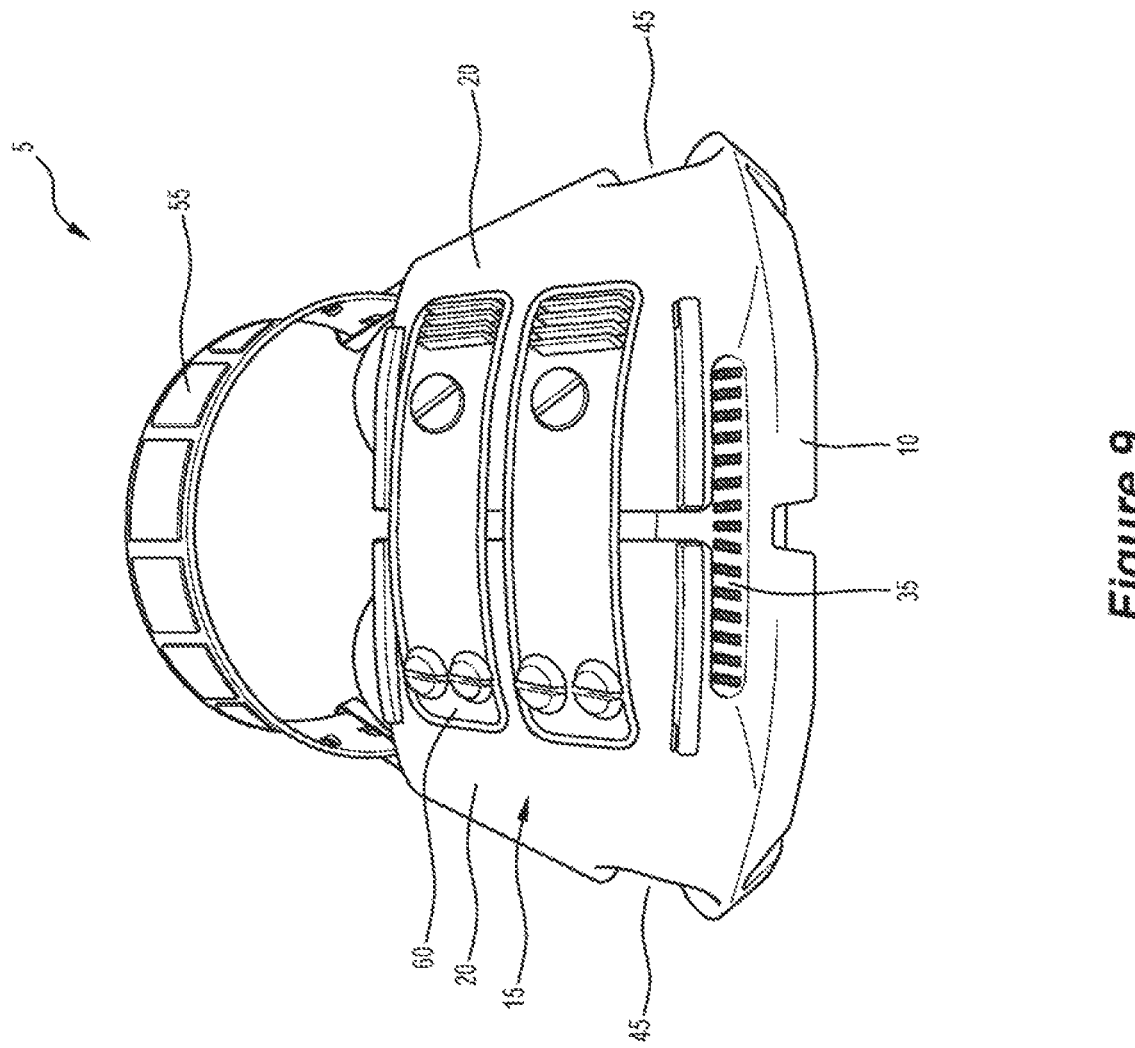
FIG. 9 is a front view of the equine boot of FIG. 8.
Figure 10:
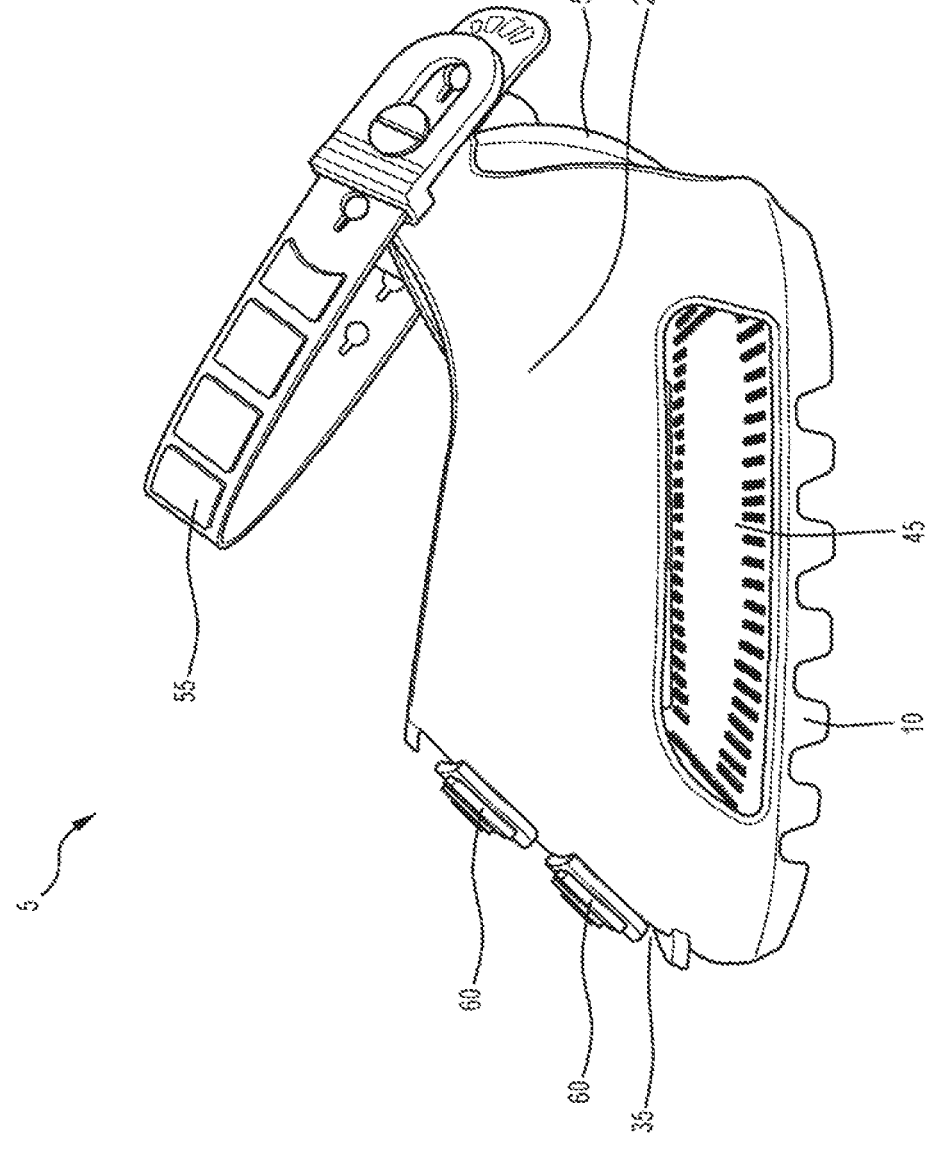
FIG. 10 is a side view of the equine boot of FIG. 8.
Figure 10:
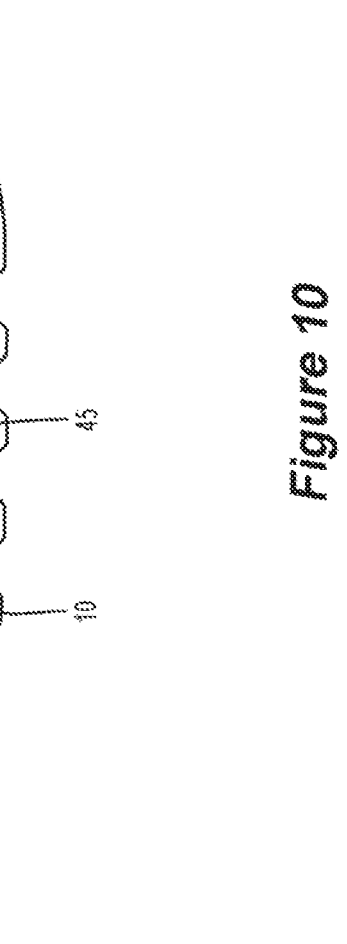
Figure 11:
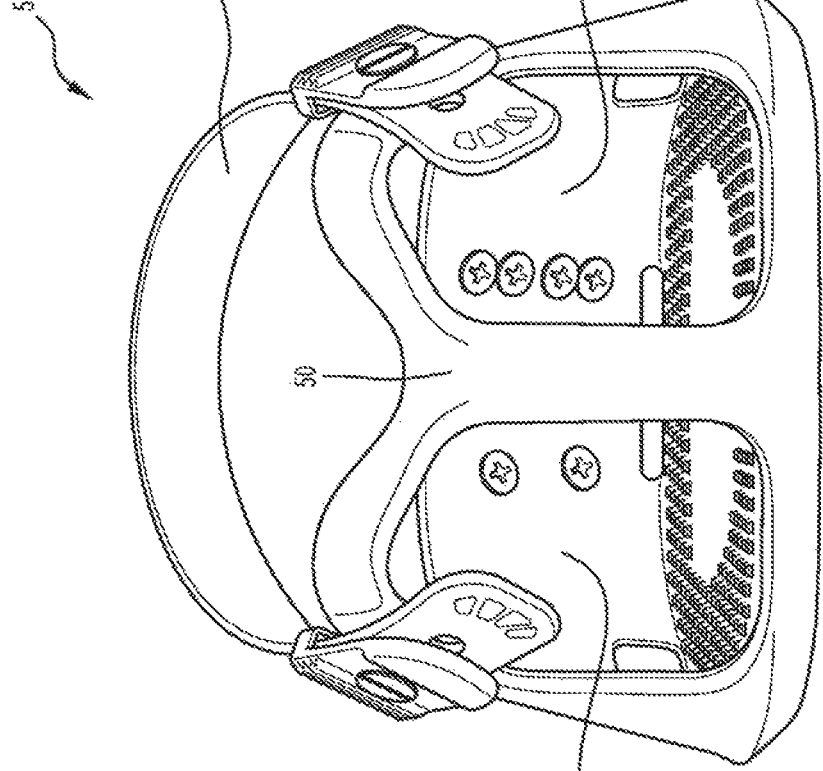
FIG. 11 is a rear view of the equine boot of FIG. 8.
Figure 12:
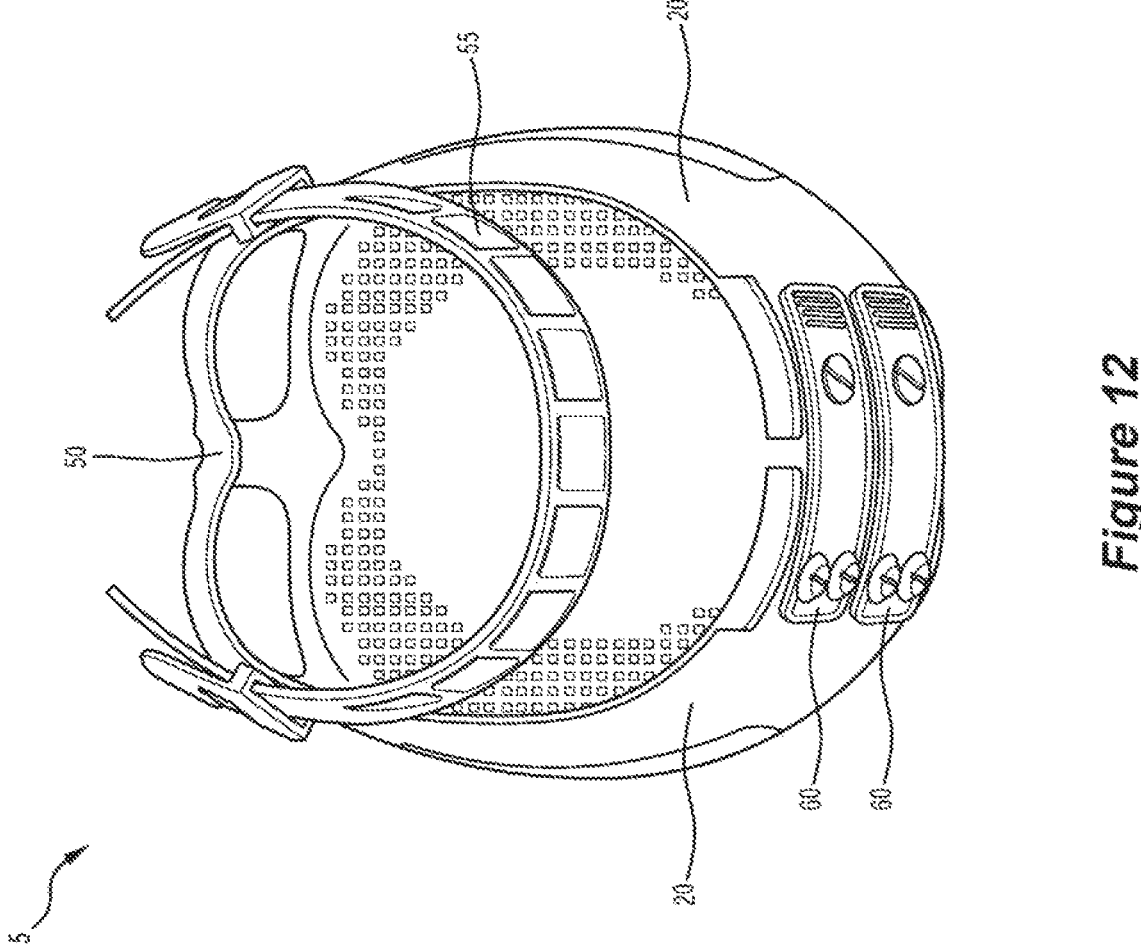
FIG. 12 is a top view of the equine boot of FIG. 8.

Referring to FIGS. 9 and 1 0, the boot 5 of the third embodiment also includes a movable strap 55 which can be secured around the pastern of a horse's leg, thereby reducing the likelihood of the boot 5 detaching or being flung from the horse during use. As can be seen in FIG. 11, each end of the strap 55 is connected to a respective side of the boot, and can be swivelled about these connection points. In the depicted embodiment, the connection points are simply screws. The strap 55 is lined with a number of openings through which respective screws can be received; the tightness of the strap around the horse's leg can thus be adjusted by selecting an appropriate opening(s) in the strap 55 to receive the screw.

Figure 8:
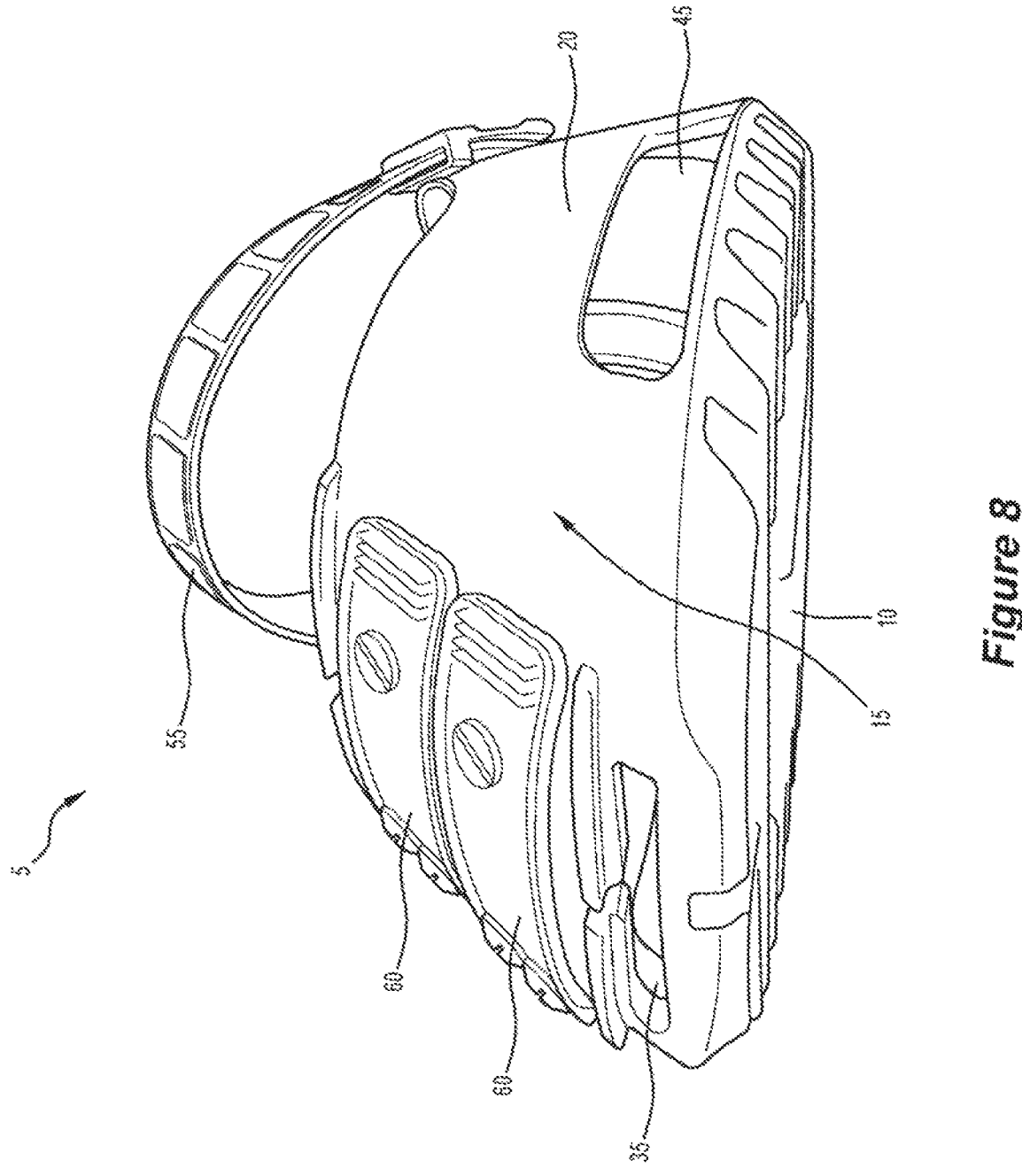
FIG. 8 is a front perspective view of an equine boot according to a third embodiment of the present invention.

Like the boot of the second embodiment, the boot depicted in FIGS. 8 to 12 also has a number openings which allow easy access and cleaning of the hoof, including the underside thereof. As can be seen in FIG. 8, the horizontal aperture 35 at the toe end of the boot 5 is open to the interior surface of the hoof-engaging bottom portion 40. Similarly, the two elongate openings 45 disposed in the side walls 20 are also open to the level of the sole of the boot—in other words, the elongate openings 45 open to the interior surface of the hoof-engaging bottom portion 40. Referring to FIG. 11, the rear of the boot 5 is substantially open, but for the shank or web 50 which engages with the cleft of the bulbs of the hoof to impede rotation of the boot 5 relative to the hoof. The combination of the open rear, and sole-level aperture 35 and elongate openings 45 work together such that cleaning liquids and apparatuses can easily access and clean the hoof, including the underside of the hoof, while the boot is worn. Liquids flushed in one opening can easily exit another. Tools such as screwdrivers can be inserted into any one of the sole-level openings to pry the bottom portion 40 of the boot 5 away from the underside of the hoof to gain better access thereto.

While various embodiments of the present invention have been described above, it should be understood that they have been presented by way of example only, and not by way of limitation. It will be apparent to a person skilled in the relevant art that various changes in form and detail can be made therein without departing from the spirit and scope of the invention. Thus, the present invention should not be limited by any of the above described exemplary embodiments.

Throughout this specification and the claims which follow, unless the context requires otherwise, the word "comprise", and variations such as "comprises" or "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavour to which this specification relates.

What is claimed is:

1. An equine boot comprising:
   a sole for engaging the ground, an upper face of the sole defining an interior surface for engaging an underside of a hoof, the interior surface extending in length from a toe end to a rear end of the boot;
   an upper having side walls for substantially enclosing respective lateral sides of the hoof;
   a securement configured to engage a rear of the hoof so as to impede rotation of the boot relative to the hoof; and
   elongate openings formed through respective side walls of the upper at respective lower ends thereof, wherein:
      a bottom edge of each elongate opening is level with the interior surface of the sole;
      when the boot is worn, the elongate openings extend along respective lateral sides of the hoof;
      each elongate opening is generally centrally disposed in the respective side walls at a level of the interior surface of the sole, between the toe end and the rear end of the boot; and
      each elongate opening is positioned along the length of the interior surface so as to permit, in use, a width of a lower end of the hoof to extend through the openings at the level of the interior surface of the sole.

2. The boot of claim 1, wherein the side walls are opposed and spaced apart such that fluid can flow through the elongate opening in one of the side walls, flush the underside of the hoof and be drained from the boot through the elongate opening in the other one of the side walls.

3. The boot of claim 1, further comprising an aperture through which fluid can reach the underside of the hoof to flush debris therefrom.

4. The boot of claim 3, wherein the aperture is formed at a lower portion of the toe end of the boot, and water can be flushed through the aperture and drained through the elongate openings of the upper and/or an open end of the boot.

5. The boot of claim 3, wherein a slit at the toe end of the boot at least partially separates the side walls, the slit opening up into the aperture.

6. The boot of claim 1, wherein the rear end of the boot is at least partially open such that a rear of the hoof is at least partially uncovered by the boot.

7. The boot of claim 6, wherein the rear end of the boot is open down to the interior surface.

8. The boot of claim 1, wherein the upper and/or the bottom sole is/are made from a resilient material.

9. The boot of claim 1, wherein the securement is configured to engage a cleft of bulbs of the hoof.

10. The boot of claim 9, wherein the securement includes a shank or web configured to contact, mesh or interlock with the cleft to impede rotation of the boot relative to the hoof.

11. The boot of claim 1, wherein the securement includes an upper portion configured to engage against an upper end of bulbs of the hoof.

* * * * *